United States Patent [19]

Fritz

[11] Patent Number: 4,463,499
[45] Date of Patent: Aug. 7, 1984

[54] PORTABLE CHAIN SAW SHARPENING KIT WITH DEPTH GAUGE FILING ATTACHMENT

[76] Inventor: Thomas A. Fritz, 8104 Larch La., Vanderburgh County, Evansville, Ind. 47710

[21] Appl. No.: 498,555

[22] Filed: May 26, 1983

Related U.S. Application Data

[62] Division of Ser. No. 308,105, Oct. 2, 1981, Pat. No. 4,404,872.

[51] Int. Cl.³ .............................................. B23D 59/00
[52] U.S. Cl. .................................. 30/382; 16/110 R; 16/DIG. 12; 76/77; 145/35 D
[58] Field of Search ...................... 76/25 A, 31, 37, 36, 76/74, 112, 75, 77; 30/382, 151, 286; 16/111 R, 114 R, DIG. 12, DIG. 18, DIG. 19, DIG. 24, 110 R; 74/551.9, 557; 145/35 D, 61 L, 61 R; 81/177 D, 3 J, 177.8, 439, 440; 104/202; 33/202, 180 R, 181

[56] References Cited

U.S. PATENT DOCUMENTS 2,340,868 2/1944 Dye ................................... 104/202
2,448,384 8/1948 Meinzinger ........................... 81/3J
2,876,486 3/1959 Lindstrom ............................ 74/557

FOREIGN PATENT DOCUMENTS 971708 4/1950 France ............................. 145/35 D
112577 11/1925 Switzerland .................. 16/DIG. 12

Primary Examiner—Roscoe V. Parker
Attorney, Agent, or Firm—Irons & Sears

[57] ABSTRACT

An attachment is provided for allowing a chain saw sharpener to be used for filing the depth gauge portions of the cutting links on the saw chain. The sharpener is of the type comprising a sharpener body in the form of an inverted U-shaped channel-defining member adapted to be placed over the bar of a chain saw, and a rotary burr with an abradant end portion which is receivable in a selected one of two horizontal guide bores provided in the sharpener body. The depth gauge attachment comprises an elongated gauge bar and means for removably affixing the gauge bar within the upper portion of the sharpener body channel so that the gauge bar occupies only a portion of the channel length. The thickness of the gauge bar is such that it causes the saw chain to assume a sufficiently lower position within the sharpener body channel to bring the top of the depth gauge portion of a cutting link into contact with the abradant end portion of the rotary burr when the latter is inserted into a selected one of the two guide bores. A protective hand slide is also provided for allowing the saw chain to be manually advanced during the depth gauge filing operation.

2 Claims, 14 Drawing Figures

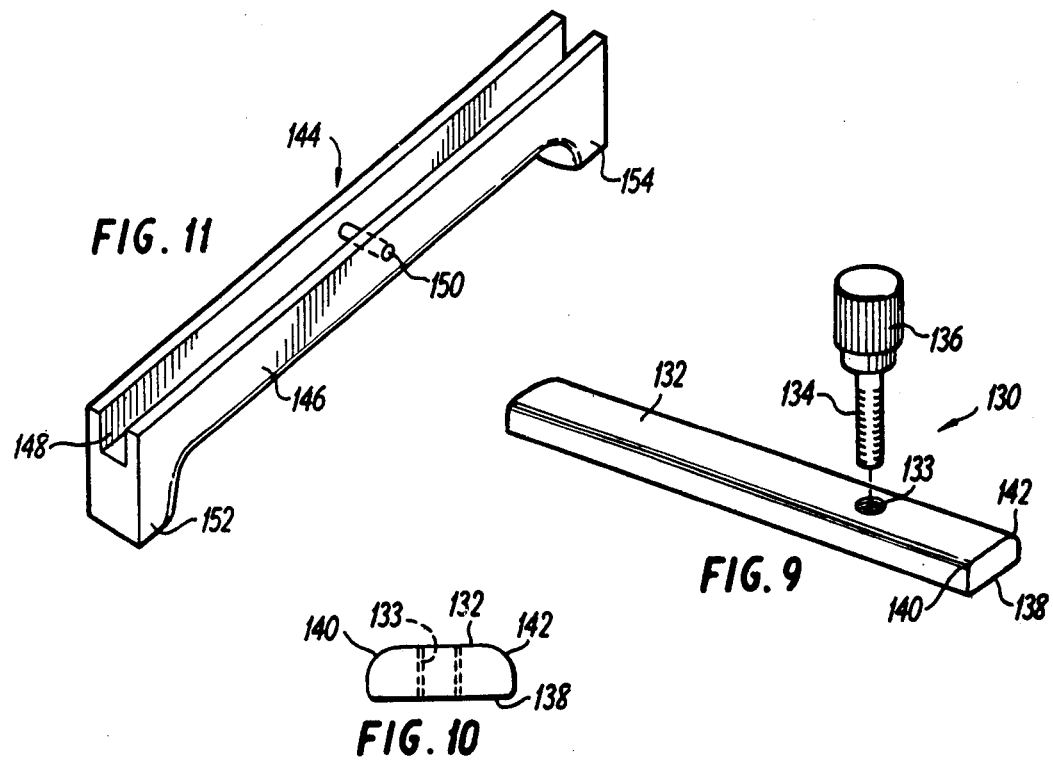
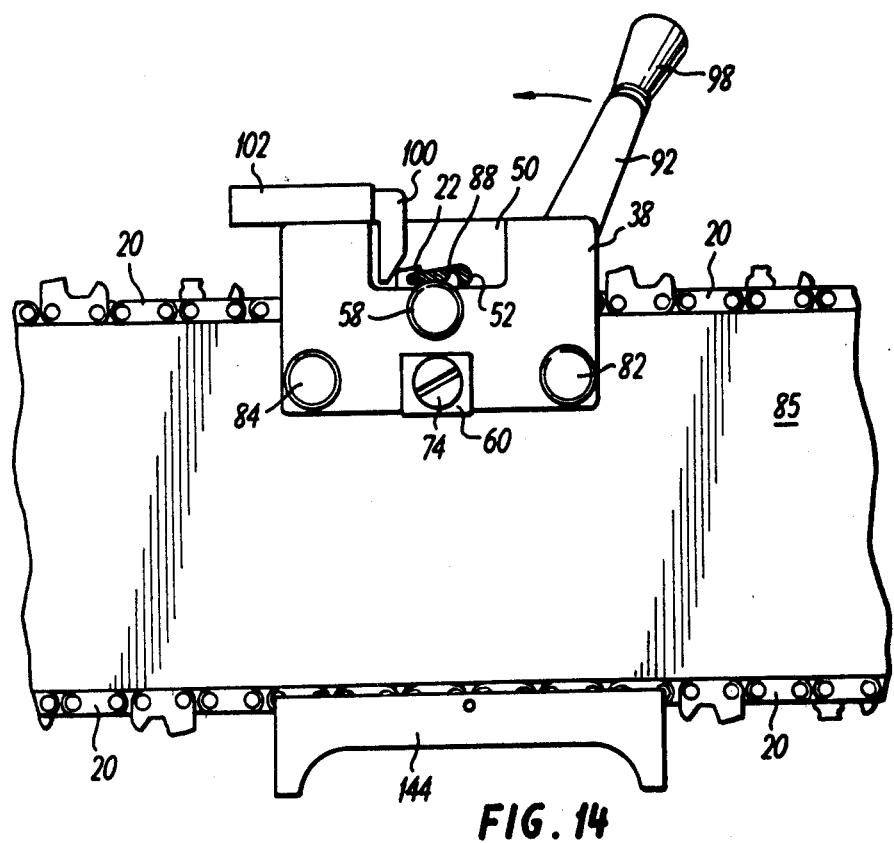

PORTABLE CHAIN SAW SHARPENING KIT WITH DEPTH GAUGE FILING ATTACHMENT

This is a division of application Ser. No. 308,105, filed Oct. 2, 1981 and now U.S. Pat. No. 4,404,872.

BACKGROUND OF THE INVENTION

1. Field of the Invention

The present invention relates generally to portable chain saw sharpening devices, and is particularly concerned with devices of this type in which the sharpener body is provided in the form of an inverted U-shaped member adapted to be placed over the bar of a chain saw.

2. Description of the Prior Art

Power-driven chain saws are widely used both for commercial purposes, as for example in clearing areas of land of trees and brush in preparation for the construction of buildings and dwellings, and for non-commercial purposes such as cutting firewood for home use or pruning unwanted branches from trees. A problem that has always confronted chain saw users, however, is that of maintaining the necessary degree of sharpness in the cutting edges of the saw chain. Without periodic sharpening, the cutting links of the saw chain eventually become dull with use, requiring additional pressure on the chain saw to effect the desired cut. A particular problem is presented when the teeth on one side of the saw chain are dull in comparison to the teeth on the other side, as often happens when the saw chain is brought into contact with a material other than wood (e.g., a nail or a piece of fence wire) during cutting. This condition will cause the chain saw to deviate from a straight cut, resulting in crooked cutting. A similar result occurs when the teeth on one side of the saw chain are longer than those on the other side of the saw chain.

In the past, large specially-designed machines have been provided for sharpening the saw chain used on chain saws. However, inasmuch as these machines usually require removal of the saw chain from the remainder of the chain saw, they are rather inconvenient to use. Then, too, machines of this type are not always available to non-commercial or occasional users of chain saws, such as farmers and homeowners. For this reason, it has been common among such users to handsharpen the cutting edges of the saw chain using an ordinary round file. This procedure is rather tedious and time-consuming, particularly since the orientation of the file must continually be changed to accommodate the oppositely-facing cutting links that alternate on the saw chain. Moreover, the hand-sharpening procedure does not always produce uniform sharpening of all the cutting links on the saw chain. Another drawback of hand sharpening is that the file can etch longitudinal scratches on the cutting surfaces, which then tend to retain sap and dirt from the wood being cut. As the scratches fill, the cutting surfaces become dull and additional downward pressure is needed to cause cutting. This, in turn, gives rise to frictional heat build-up which can cause annealing or softening of the saw chain teeth.

In an attempt to remedy these problems, the so-called "self-sharpening" chain saw has been developed. Chain saws of this type typically include a self-contained stone grinding wheel which is brought into contact with the saw chain as the latter travels around the saw bar. The inherent problem with this approach is that the grinding wheel is altered each time that it is used due to the gradual wearing away of the cutting abrasives. As a result, the configuration of the cutting teeth changes as the grinding wheel ages, and consistent and uniform sharpening of the saw chain becomes impossible with time.

Perhaps the most useful kind of chain saw sharpener that has been proposed, at least from the standpoint of the average non-commercial user not having access to sophisticated sharpening machinery, is the portable chain saw sharpener of the type which can be attached directly to the saw bar for sharpening the cutting teeth when required, and then removed. Since the abradant sharpening element is not part of the chain saw itself, it can be replaced as necessary to assure a consistent degree of sharpening. Moreover, since sharpeners of this type usually include some sort of aligning or positioning fixture for the abradant sharpening element, the possibility of unequal sharpening as between the different cutting teeth on the saw chain is largely avoided. Most importantly, sharpeners of this type are usually compact and inexpensive devices which are economically attractive to noncommercial users of chain saws.

A large variety of portable chain saw sharpeners, sometimes taking the form of simple filing guides or templates, have been proposed in the prior art. See, for example, the following United States patents:

| | |
|---|---|
| 2,594,821 | 3,172,306 |
| 2,677,289 | 3,172,307 |
| 2,755,559 | 3,283,615 |
| 2,762,241 | 3,438,286 |
| 2,770,985 | 3,543,612 |
| 2,813,438 | 3,670,600 |
| 2,871,728 | 3,744,349 |
| 3,060,768 | 3,889,556 |
| 3,071,987 | |

A particularly useful type of portable chain saw sharpener is disclosed in U.S. Pat. No. 2,770,985, to A. W. Pearce. The sharpener consists of a channel-shaped frame with spaced parallel walls and clamping screws for affixing the sharpener to the bar of a chain saw in a straddling manner. The walls are provided with two pairs of aligned bores arranged diagonally with respect to the frame. A rotatable abrading implement is removably engaged in one or the other of the two pairs of aligned bores to sharpen the saw teeth positioned between the two walls. The walls are connected by a web at the top of the sharpener which is provided with a sight opening through which the saw teeth are visible during sharpening. By engaging the rotary abrading implement first in one of the two pairs of aligned bores and then in the other, the two sets of oppositely-directed cutting teeth on the saw chain can be sharpened without removing the sharpener from the saw bar.

Notwithstanding the utility and simplicity of the foregoing arrangement, at least two problems still remain. In the first place, in the absence of any means for positively locating the cutting link within the body of the sharpener prior to and during sharpening, consistent and uniform sharpening of all the cutting links is not assured. Moreover, the disclosed sharpener includes no provision for filing the depth gauge portions of the cutting links, which are essential in maintaining the proper depth to which the cutting edges penetrate the wood being cut. If the depth gauges are set too high, the cutting edges will be unable to penetrate sufficiently, requiring increased downward pressure on the chain saw to enable cutting. If they are set too low, the penetration of the cutting edges into the wood will be too great, causing grabbing and jerking of the chain saw.

More recently, in U.S. Pat. No. 3,744,349, to A. A. Juncker, a portable chain saw sharpener has been proposed in which the guide bores are provided in a movable carriage mounted on one side of the sharpener frame, rather than in the form of pairs of aligned bores penetrating both side walls of the sharpener as in U.S. Pat. No. 2,770,985. A system of guide bars and screws is provided in the device of U.S. Pat. No. 3,744,349 to allow adjustment of the carriage in both the horizontal and vertical directions. In addition to the two clamping screws used for affixing the sharpener body to the bar of the chain saw, a third clamping screw is provided for securing a chain tooth temporarily relative to the sharpener frame. Once the tooth is clamped in position, the end of a tapered carbide steel file is inserted into one of the guide bores and the carriage is adjusted until the file touches the edge of the tooth. The carriage is then locked in position and sharpening is carried out by advancing the file, which now is rotated by a power drill, across the front of the tooth and back. The next tooth is then advanced to the same position, which is established by an adjustable stop means in the form of a reversely-bent leaf spring protruding into the sharpening area. The sharpening operation is then repeated. When all of the teeth facing in one direction have been sharpened, the file is inserted in the second guide bore and the process is repeated for the teeth facing in the other direction. In order to allow for grinding of the depth gauges, the carriage is provided with a third guide bore disposed above the first two. After sharpening, a further adjustment of the carriage is made to bring the third guide bore into alignment with the depth gauge of the first tooth, whereupon the turning file is inserted into the third guide bore to grind the depth gauge to the desired level. This operation is then repeated for the depth gauges of the remaining teeth.

Although the sharpener described by U.S. Pat. No. 3,744,349 possesses the undeniable advantage of combining the sharpening and depth gauge filing functions in a single device, there are several disadvantages inherent in its design and its intended manner of operation. In the first place, the need for a movable carriage to adjust the position of the guide bores adds an undesireable degree of complexity to the device, as compared to the essentially unitary sharpeners of the type described, for example, by the previously-noted U.S. Pat. No. 2,770,985. Further, the described procedure of using the carbide steel file for adjusting the position of the guide bores relative to the cutting teeth, relying as it does on bringing the tooth into registry with some point on the gradually tapering end of the file, is inherently imprecise. The amount of sharpening will clearly depend upon how far the tapered file is inserted into the guide bore during the adjustment procedure, which is determined simply by visual approximation. If the approximation is incorrect, either too much or too little material will be removed from the cutting edge of the tooth during sharpening, and the adjustment must be repeated. Although the movable carriage assembly would no doubt facilitate such repeated adjustments, the adjustment procedure is still rather tedious and time consuming, since it amounts essentially to a trial-and-error process. Finally, and perhaps most importantly, the use of the file for adjusting the relative positions of the guide bores and the cutting teeth creates the risk of damage to the brittle carbide material of which the file is made. Such damage might occur, for example, as a result of inadvertently striking the file against the edge of a cutting tooth that is positioned too close to the guide bore before the adjustment is made. To the extent that such damage might necessitate premature replacement of the file, the user of the sharpener will be put to an additional and undesirable expense.

SUMMARY OF THE INVENTION

In accordance with the present invention, a portable chain saw sharpening kit comprises a sharpener body in the form of an inverted U-shaped channel-defining member adapted to be placed over the bar of a chain saw, said sharpener body being provided with an opening therein exposing a portion of the channel and with first and second guide bores converging toward each other at equal angles with respect to a line perpendicular to the channel axis; first clamping means for clamping a cutting link in a selected position within said sharpener body; second clamping means for clamping the sharpener body to the bar of a chain saw; a rotary burr receivable in a selected one of the first and second guide bores, said rotary burr having an abradant end portion for sharpening a cutting link positioned within the sharpener body; and an alignment pin receivable in a selected one of said first and second guide bores for aligning a cutting link within the sharpener body prior to sharpening. The alignment pin comprises a shank portion and a reduced end portion for abutting against the edge of the cutting link to be sharpened, said reduced end portion being dimensioned to allow for the removal of a predetermined amount of material from the edge of the cutting link when the rotary burr is subsequently inserted into the selected guide bore for sharpening.

In a preferred embodiment of the invention, the shank portion and the reduced end portion of the alignment pin are both circular in cross-section but have different diameters. Preferably also, the reduced end portion of the alignment pin is eccentrically offset from the shank portion of the alignment pin, and means are provided for rotationally positioning the alignment pin within a selected one of the first and second guide bores in the sharpener body. In a particularly preferred embodiment of the invention, the alignment pin includes an enlarged head portion on the end of the shank portion opposite to the reduced end portion, and the aforesaid rotational positioning means comprises a projection on the underside of the head portion for engaging corresponding notches formed on the sharpener body. Where the reduced end portion of the alignment pin is eccentrically offset from the shank portion, as in the preferred embodiment, the reduced end portion preferably has a diameter substantially equal to the widest diameter of the abradant end portion of the rotary burr.

The use of the aforesaid alignment pin provides a number of distinct advantages over the prior art. In the first place, it avoids the necessity of using the rotary burr itself as the means for adjusting the position of the saw chain cutting links within the channel of the sharpener body, and therefore avoids the possible damage to the burr that may occur during this procedure. If a cutting link is positioned too close to the selected guide bore before the adjustment is made, it is the alignment pin (rather than the burr) that strikes the improperly positioned cutting link. By the time the rotary burr is inserted, the cutting link is in the proper position and the burr engages the cutting link only to the extent required for proper sharpening.

The alignment pin also allows the cutting link position to be adjusted more precisely, and with less effort, than would be possible by using the rotary burr for this purpose. As noted earlier, the prior art procedure for positioning the cutting links using the rotary burr requires that the cutting link be brought into contact with some point on the tapered end of the burr, as by partial insertion of the burr into the guide bore. When the burr is then fully inserted into the guide bore for sharpening, the amount of material removed from the sharpened edge of the cutting link will depend upon the difference between the maximum diameter of the burr and its diameter at the point on its tapered end that was brought into contact with the cutting link during the adjustment procedure. The latter point, having been selected simply by visual approximation from various other possible points on the gradually tapered end of the burr, will not necessarily be accurate enough to assure the proper amount of sharpening. As a result, either too much or too little material will be removed from the edge of the cutting link during sharpening. The adjustment must therefore be repeated until the proper amount of sharpening is obtained. This is essentially a trial-and-error procedure and, although it can be facilitated by a movable carriage assembly as provided in the prior art, it is nevertheless a rather tedious and time-consuming operation. The use of the alignment pin as provided in the present invention eliminates these disadvantages. Since the reduced end of the alignment pin is properly dimensioned relative to the burr diameter to provide the proper amount of sharpening, the position of the cutting link within the sharpener body can be accurately adjusted the first time, without the need for subsequent fine adjustments. As a result, there is no requirement for a movable carriage assembly or the like, and the sharpener body can therefore be provided as a unitary structure which is simple to use and inexpensive to manufacture.

In accordance with another important aspect of the present invention, the sharpener is provided with a depth gauge attachment for allowing the rotary burr to be used for filing the depth gauges of a cutting link. The depth gauge attachment comprises an elongated gauge bar shaped and dimensioned to be received in the upper part of the channel of the sharpener body, and means for removably affixing the gauge bar within the upper part of the channel. The gauge bar is provided with a flat surface on the underside thereof to provide a guide surface for the upper portions of the cutting links on the saw chain, with the thickness of the gauge bar being selected to cause the saw chain to assume a sufficiently lower position within the channel of the sharpner body to bring the top of the depth gauge portions of the cutting links into contact with the abradant end portion of the rotary burr when the rotary burr is inserted into one of the two guide bores in the sharpener body. The gauge bar is affixed in the upper portion of the sharpener body channel in a manner such that the guage bar occupies only a portion of the channel length, said portion not including the area immediately adjacent to the open end of the guide bore in which the rotary burr is inserted. Preferably, the gauge bar is of sufficient length to protrude beyond one end of the channel in the sharpener body when affixed therein, with the protruding portion of the gauge bar thereby forming a guide for the saw chain outside the sharpener body.

In a preferred embodiment of the invention, the top of the sharpener body is provided with a through-hole which opens into the sharpener body channel, and the gauge bar is provided with a threaded bore at a point along its length. The means for removably affixing the gauge bar within the upper portion of the sharpener body channel may then comprise a threaded fastener adapted to be loosely received through the through-hole in the top of the sharpener body and to be threadably engaged with the threaded bore in the gauge bar. The threaded fastener is provided with an enlarged head portion at one end thereof for bearing against the top of the sharpener body in order to bring the gauge bar into abutting contact with the upper portion of the sharpener body channel. In order to assure a smooth mechanical fit, the longitudinal edges of the gauge bar are preferably beveled, and the upper interior longitudinal edges of the sharpener body channel are preferably rounded in a manner complementing the beveled edges of the gauge bar.

The aforesaid depth gauge attachment provides a simple yet effective means for adapting the basic sharpener assembly for use in filing the depth gauge portions of the saw chain cutting links after the sharpening operation has been completed. A particularly important advantage of the depth gauge attachment is that it does not require any modification of the basic sharpener assembly, other than the provision of a simple through-hole in the top of the sharpener body to accommodate the threaded fastener by which the gauge bar is held in position within the sharpener body channel. As a result, the manufacturer need only provide one version of the basic sharpener assembly, which can be sold with or without the depth gauge attachment. If the purchaser of the basic sharpener later has a need for the depth gauge attachment, this can be purchased separately and readily attached to the originally-purchased sharpener.

The sharpener of the present invention may also be provided with adjustable stop means, usable during the sharpening operation but not needed during the depth gauge filing operation, said adjustable stop means being attachable to the sharpener body in lieu of the depth gauge attachment. The stop means comprises, in particular, a pawl member supported on the top of the sharpener body and extending downwardly through the opening in the sharpener body into the sharpener body channel, and means for adjustably mounting the pawl member on the top of the sharpener body for selective movement along the direction of the sharpener body channel. The pawl member is arranged to abut the rear portion of a cutting link located within the sharpener body channel in order to position the cutting link relative to the open end of a selected one of the two guide bores in the sharpener body, and is further arranged to be freely pivotable in one direction and restrained against movement in the other direction. The means for adjustably mounting the pawl member on the top of the sharpener body comprises a substantially U-shaped member disposed horizontally on top of the sharpener body and a clamping screw which passes through the open central portion of the U-shaped member and is threadably received in the through-hole provided in the top of the sharpener body for clamping the U-shaped member in a selected position along the top of the sharpener body. The pawl member is pivotally supported at the open end of the U-shaped member and extends downwardly therefrom through the opening in the sharpener body and into the sharpener body channel.

In accordance with an important feature of the invention, the sharpener body is provided with a raised boss which is engageable with the open central portion of the U-shaped member for guiding the motion of the U-shaped member in a direction parallel to the axis of the sharpener body channel. To facilitate this guiding function, the raised boss is preferably elongated in a direction parallel to the axis of the sharpener body channel. The raised boss also prevents possible shifting of the U-shaped member about the clamping screw while the sharpener is in use.

By providing for alternative attachment of the depth gauge attachment or the stop means, the latter not being required during the depth gauge filing operation, the sharpener need only carry, at any given time, the minimum number of parts required for performing the job at hand. This is an advantage from the standpoint of portability as well as simplicity. However, it is within the scope of the invention to provide the sharpener only with the stop means and not the depth gauge attachment, or vice-versa, since it is conceivable that some purchasers of the sharpener may have a need for one and not the other. In that event, it is still advantageous to provide for interchangeable attachment of the stop means and the depth gauge attachment to the sharpener body, as in the preferred embodiment, since this eliminates the need to manufacture a different type of sharpener body for each purpose.

In accordance with a further aspect of the invention, a protective hand slide is provided for manual engagement with the bar of a chain saw on the side opposite to that on which the sharpener body is placed. The protective hand slide preferably comprises an elongated handle member adapted to be placed against the edge of the saw bar, said handle member having a longitudinal channel therein for receiving the saw chain and a transversely-mounted pin within said channel for enqaging a cutting link of the chain saw. The handle member preferably includes enlarged portions at each end thereof on the side opposite the channel of the handle member in order to prevent the user's hand from inadvertently slipping off the protective hand slide. The hand slide allows the user to manually advance the saw chain around the bar while using the sharpener of the present invention, without the the risk of injury from the sharpened cutting edges of the cutting links. Although the protective hand slide is intended primarily for use during the depth gauge filing operation, it can also be used to advance the next cutting link into position between sharpening operations.

The present invention also comprehends a method for using an alignment pin of the type described herein, and a method for using a depth gauge attachment of the type described herein, as will become apparent from the detailed description to follow.

BRIEF DESCRIPTION OF THE DRAWINGS

The various objects, advantages and novel features of the present invention will be more readily apprehended from the following detailed description when read in conjunction with the appended drawings, in which:

FIG. 9 is an exploded perspective view of a depth gauge attachment in accordance with the present invention, usable with the chain saw sharpener of FIGS. 2-6;

FIG. 10 is an end view of the gauge bar which forms a part of the depth gauge attachment of FIG. 9;

FIG. 11 is a persepective view of a protective hand slide in accordance with the present invention, usable in connection with the sharpener of FIGS. 2-6;

FIG. 14 is a side elevational view illustrating the use of the hand slide in connection with the sharpener of FIGS. 2-6 for sharpening of the cutting links on the saw chain.

Throughout the drawings, like reference numerals will be understood to refer to like parts.

DESCRIPTION OF THE PREFERRED EMBODIMENT

Figure 1:
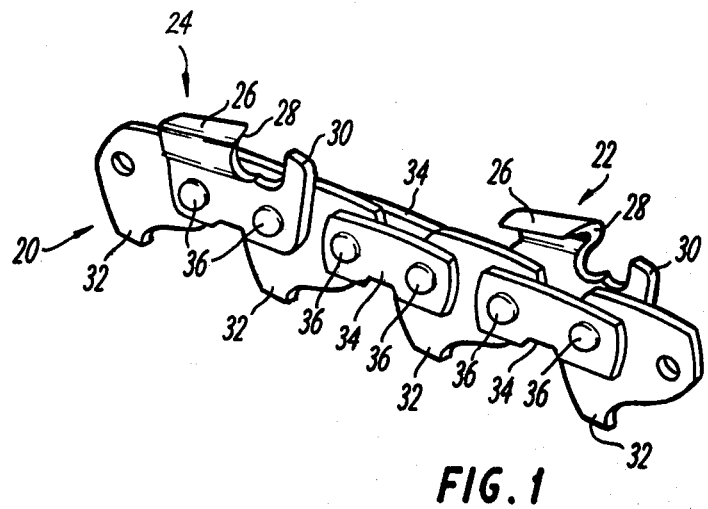
FIG. 1 illustrates a section of a commonly-used type of saw chain, shown removed from the bar of the chain saw for clarity.

A section of a type of saw chain which is commonly used on power-driven chain saws is illustrated in FIG. 1. In the interest of clarity, the saw chain 20 is shown removed from the bar of the chain saw. The saw chain 20 comprises a series of right-hand cutting links 22 and left-hand cutting links 24, alternately positioned on the chain. Each cutting link is made up of two operative portions, specifically, a curved cutting portion 26 which defines a curved cutting edge 28, and an upstanding projection 30 in front of the cutting edge which is usually referred to as a depth gauge. The cutting edges are ground at a predetermined rake angle, typically 35°, with respect to a line drawn perpendicular to the length of the cutting link. When the chain saw is in use, the depth gauge 30 leads the cutting edge 28 into the wood and determines the depth of penetration of the cutting edge into the wood. The saw chain 20 also includes drive links 32 which are engaged by the sprocket of the chain saw in order to propel the chain around the saw bar. The edge of the saw bar is ordinarily provided with a channel for receiving the lower portions of the drive links 32, thereby maintaining the saw chain 20 in position along the periphery of the bar. The drive links 32 and cutting links 22, 24 are interconnected by tie straps 34 and rivets 36, as shown, to form a continuous chain which extends around the saw bar in an endless loop. The foregoing details of the saw chain 20 are conventional and form no part of the present invention.

Figure 2:
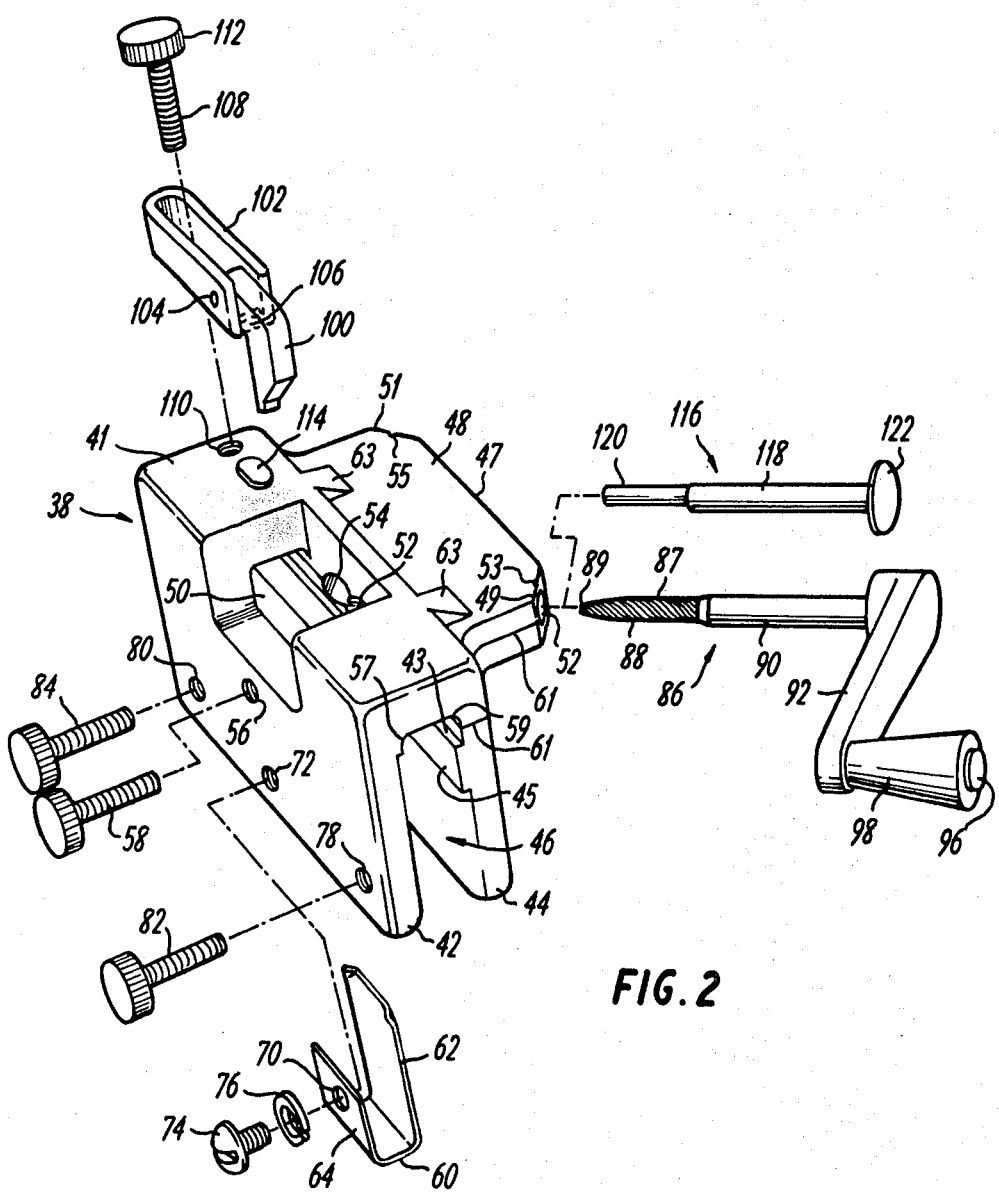
FIG. 2 is an exploded perspective view of a chain saw sharpening kit in accordance with the present invention.

The chain saw sharpening kit of the present invention will now be described with reference to FIGS. 2-6. In FIG. 2, the basic sharpening kit is illustrated in an exploded perspective view in order to illustrate the various components thereof. FIGS. 3, 4, 5 and 6 illustrate the assembled sharpening kit in a left side elevational view, front elevational view, right side elevational view, and plan view, respectively, with a portion of the saw bar being shown in each case to illustrate the manner in which the sharpener is mounted thereon.

As best seen in FIG. 2, the sharpening kit includes a unitary sharpener body 38 in the form of a channel member adapted to be placed over the bar of a chain saw. The sharpener body 38 includes a U-shaped portion which comprises an upper web including end portions 40 and 41, first and second spaced-apart, parallel side walls 42 and 44, respectively, which extend downwardly from the upper web 40, 41 to define a channel 46 therebetween, and a horizontal extension 48 projecting outwardly from the second side wall 44 on the side opposite the channel 46. Adjoining central portions of the upper web 40, 41 and first side wall 42 are cut away, as shown, to define an open viewing area 50 near the center of the channel 46 for receiving a cutting link of the saw chain to be sharpened. The horizontal extension 48 is provided with first and second horizontal guide bores 52 and 54, respectively, which extend from opposite corners of the horizontal extension 48 and open through the second side wall 44 into the open cutting link receiving area 50 of the channel 46. The corners 49 and 51 of the horizontal extension 48 are flattened, as shown, to accommodate the openings of the guide bores 52 and 54, respectively, and are provided with notches 53, 55 for a purpose to be described hereinafter.

Figure 6:
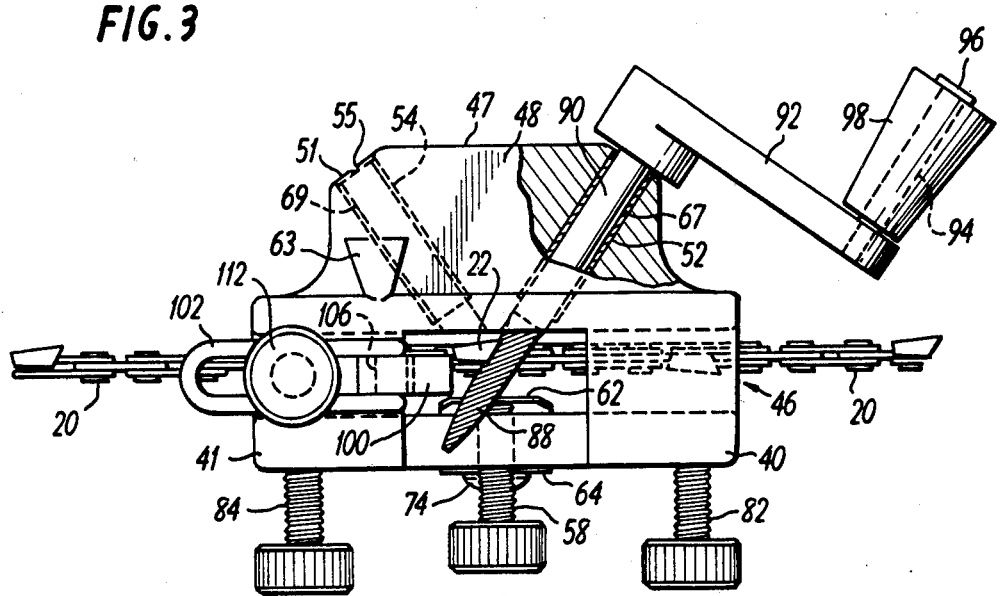
FIG. 6 is a plan view of the chain saw sharpener of FIG. 2, together with a portion of the saw bar on which the sharpener is mounted.

As will be more clearly apparent from the plan view of FIG. 6, the guide bores 52 and 54 converge toward each other as they approach the channel 46, and are inclined at equal angles with respect to a line perpendicular to the channel axis. The inclination angle of each of the guide bores 52 and 54 is preferably 35° to match the rake angle of the cutting edges on the right- and left-hand cutting links 22 and 24 in FIG. 1. The flattened corners 49, 51 of the horizontal extension 48 lie in planes perpendicular to the axes of the respective guide bores 52, 54, whereby these planes diverge outwardly in the direction of the channel 46 at equal 55° angles with respect to a line perpendicular to the channel axis. Thus, the flattened corners 49, 51 are each inclined at an angle of 35° relative to the outer edge 47 of the horizontal extention 48.

Figure 4:
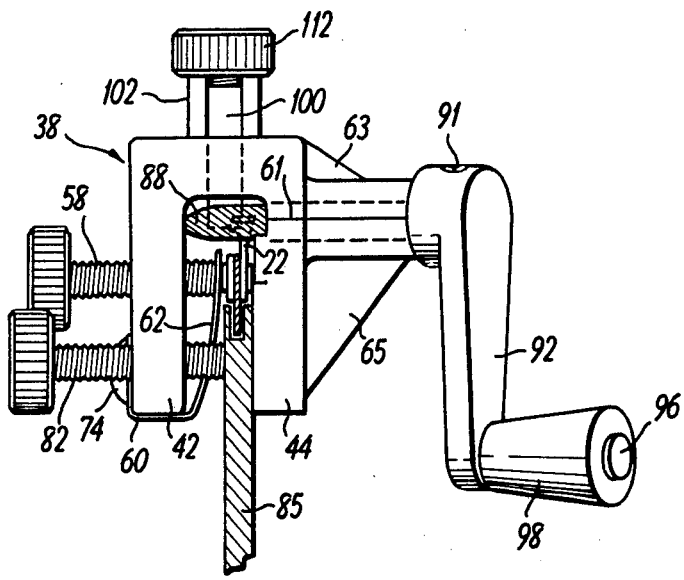
FIG. 4 is a front elevational view of the chain saw sharpener of FIG. 2, with the saw bar on which the sharpener is mounted shown in cross-section.

Referring again to FIG. 2, a threaded bore 56 is provided in the first side wall 42 of the sharpener body at a point below the open cutting link receiving area 50 for receiving a first clamping screw 58. The clamping screw 58 functions to exert clamping pressure against a cutting link which is positioned with the open area 50 of the channel 46 at a point adjacent to the open ends of the guide bores 52 and 54. The cutting link is thereby clamped against the interior surface 45 of the second side wall 44 in a position appropriate for sharpening, as shown in FIGS. 4 and 6. The clamping function of the clamping screw 58 is assisted by the provision of a flexible clamping strip 60, which may be made from spring-tempered steel or some other suitable material. As shown most clearly in FIGS. 2 and 4, the flexible clamping strip 60 is bent into a U-shape with one leg 62 made longer than the other leg 64, and is attached to the bottom edge of the side wall 42 with longer leg 62 extending upwardly along the inside surface of the side wall 42 to a point just above the lower edge of the open area 50. When the clamping screw 58 is advanced into the threaded bore 56, the end of the clamping screw 58 is brought to bear against the leg 62 of the clamping strip, which in turn bears against the side of the cutting link to be sharpened. The upper corners 66, 68 of the longer leg 62 of the clamping strip are bent inward slightly, as shown, in order to facilitate movement of the saw chain through the sharpener body channel 46 between sharpening operations. As shown in FIG. 2, the shorter leg 64 of the clamping strip is provided with a hole 70 which is aligned with a threaded bore 72 formed in the first side wall 42 of the sharpener body 38 at a point below the threaded bore 56. A screw 74 passes through the hole 70 and is engaged with the threaded bore 72 in order to attach the clamping strip 60 to the sharpener body. A lock washer 76 is interposed between the head of the screw 74 and the shorter leg 64 of the clamping strip to insure that the screw 74 remains securely engaged in the threaded bore 72.

The flexible changing strip 60 may be omitted, if desired, but its inclusion is advantageous since it presents a broad clamping surface for abutting against the side of the cutting link to be sharpened. This is desirable not only because it enhances the frictional clamping action of the clamping screw 58, but also because it is capable of exerting firm clamping pressure against any part of the cutting link to be sharpened. If, on the other hand, the clamping strip 60 is eliminated and the end of the clamping screw 58 is brought to bear directly against the side of the cutting link, the possibility exists that the end of the clamping screw may be brought into contact with a non-smooth portion of the cutting link (e.g., with one of the rivets 36 in FIG. 1) from which the clamping screw might easily disengage during the sharpening operation. As a result, the cutting link may become dislodged from its proper sharpening position relative to the openings of the guide bores 52 and 54. This possibility is substantially prevented by the use of the flexible clamping strip 60, which presents a large enough clamping surface to the cutting link to assure that the cutting link cannot become inadvertenty dislodged in this way.

With continued reference to FIGS. 2-6, the first side wall 42 of the sharpener body is provided with two additional threaded bores 78, 80 (visible in FIG. 2) at points near the lower corners of the wall 42, these additional bores being located below the level of the threaded bore 56 which receives the first clamping screw 58. Second and third clamping screws 82 and 84 are received in the threaded bores 78 and 80, respectively, for the purpose of bearing against the bar 85 of the chain saw and thereby clamping the sharpener body 38 as a whole to the saw bar, as shown in FIGS. 3-6. Since the surface of the saw bar is smooth, unlike the side of the saw chain, the clamping strip 60 which is provided for the clamping screw 58 is not required for either of the clamping screws 82, 84. All three clamping screws 58, 82 and 84 are provided with knurled heads, as shown, so that they may be conveniently manipulated by the user of the sharpener.

With the sharpener body 38 mounted and clamped to the saw bar 85 as illustrated in FIGS. 3-6, the saw chain 20 faces and abuts the underside of the upper web 40, 41, and the cutting link 22 to be sharpened is located in the open viewing area 50 of the sharpener body. After a necessary adjustment procedure, carried out in connection with the alignment or set-up pin 116 as will be described hereinafter, sharpening may be accomplished by means of the rotary burr 86. The rotary burr 86 is capable of being inserted into either one of the two horizontal guide bores 52 and 54, depending upon whether a right-hand cutting link 22 or a left-hand cutting line 24 is to be sharpened. As will be described hereinafter, the rotary burr 86 will normally be retained in one of the two guide bores 52, 54 to sharpen in sequence all the cutting links of one type (e.g., all right-hand cutting links), and will then be inserted into the other guide bore to sequentially sharpen all the remaining cutting links (e.g., all left-hand cutting links).

The rotary burr 86 is preferably made from a single piece of tungsten carbide or some other material of suitable hardness and durability, such as hardened steel. The rotary burr 86 is machined to provide a tapered abradant portion 88 at one end thereof and a smooth shank portion 90 at the other end, the latter portion being rigidly affixed to a hand crank 92. The abradant end portion 88 of the rotary burr 86 preferably takes the form of a helical pattern of machined cutting ridges, as shown, but may be machined in any other desired configuration (e.g., a cross-hatch pattern) which provides a suitable sharpening surface. Alternatively, the abradant end portion of the burr may comprise a layer or a solid body of abrasaive material of the type used in grinding wheels and grindstones to provide a sharpening surface. As used herein, the term "abradant end portion" as applied to the rotary burr will be understood to include any of the foregoing types of sharpening surfaces, or their equivalents.

The smooth shank portion 90 of the rotary burr 86 is preferably affixed to the hand crank 92 by means of a recessed Allen-head set screw 91 (visible in FIGS. 4 and 5) so that the burr 86 can be replaced when the abradant end portion 88 becomes worn or damaged, without replacing the handle 92. A swivel pin 94 (visible in FIGS. 3 and 6) with an enlarged head 96 is rigidly mounted in the hand crank 92 at the end remote from the burr 86 for supporting a freely rotatable swivel-type handle 98. The handle 98 is preferably cylindrical with a slight inward taper toward the main part of the hand crank 92, as shown, so that it can be conveniently grasped by the user of the sharpener to impart rotation to the hand crank 92 and thereby to the rotary burr 86.

It should be noted that it is within the scope of the invention to employ means other than the hand crank 92 to turn the rotary burr 86. Thus, for example, the shank portion 90 of the rotary burr may be inserted into the chuck of an electric hand drill to obtain powered operation of the burr. The hand crank 92 is preferred, however, since it eliminates the need for separate power equipment and allows the sharpening kit to be used at job sites where electric power is unavailable.

With further reference to FIGS. 2-6, the sharpening kit is also provided with adjustable stop means, in the form of an L-shaped pawl member 100, for abutting the rear portion of a cutting link located within the open area 50 of the sharpener body channel 46. As will be described hereinafter, the pawl member 100 functions to position the successive cutting links with respect to the openings of the guide bores 52, 54 in the second side wall 44 of the sharpener body 38. To this end, the pawl member 100 is supported on one end portion 41 of the upper web of the sharpener body 38 by means of a U-shaped member 102, and extends downwardly into the open area 50 of the sharpener body channel 46 where the cutting link is positioned for sharpening. The pawl member 100 is pivotally supported at the open end of the U-shaped member 102 by means of a pivot pin 104, and is freely pivotable in a direction away from the end portion 41 of the upper web on which the U-shaped member 102 is mounted (i.e., in a counter-clockwise direction as viewed in FIG. 3). The pawl member 100 is prevented from pivoting in the opposite direction by means of a small cross-member or shelf 106 (shown in phantom in FIGS. 2, 3 and 6) which is formed across the bottom part of the open end of the U-shaped member 102, preferably as an integral part thereof. In this way, the pawl member 100 will normally rest in the downwardly-extending position shown in FIGS. 2 and 3, and will be restrained against movement in a direction toward the end portion 41 of the upper web on which the U-shaped member 102 is mounted.

In order to allow adjustment of the position of the pawl member 100, the U-shaped member 102 is removably affixed to the upper web 40 by means of a clamping screw 108. The clamping screw 108 passes through the open central portion of the U-shaped member 102, and its end is received in a threaded bore 110 which is provided in the end portion 41 of the upper web of the sharpener body. When the clamping screw 108 is installed and tightened, as shown in FIGS. 3-6, the U-shaped member 108 is clamped horizontally between the enlarged head 112 of the clamping screw 108 and the upper surface of the end portion 41 of the upper web, thereby maintaining the U-shaped member 108 in a selected position along the end portion 41 of the upper web. This position can be adjusted by loosening the clamping screw 108, sliding the U-shaped member in a direction toward or away from the end portion 41 of the upper web, and then retightening the clamping screw 108. The enlarged head 112 of the clamping screw 108 is preferably knurled, as shown, to facilitate manual loosening and retightening. The result of the aforesaid adjustment is to move the pawl member 100 either toward or away from the end portion 41 of the upper web within the open area 50 of the sharpener body channel, such movement occurring in a direction parallel to the axis of the sharpener body channel 46.

In order to guide the U-shaped member 102 in its sliding movement along the top of the sharpener body, a raised boss 114 is provided on the top surface of the upper web portion 41 for engagement with the open central portion of the U-shaped member 102. The raised boss 114 is located adjacent to the threaded bore 110 and is aligned therewith in the direction of the sharpener body channel 46. As a result, the boss 114 and clamping screw 108 cooperate to restrict the sliding motion of the U-shaped member 102 to a direction parallel to the axis of the sharpener body channel 46. The raised boss 114 is preferably elongated in a direction parallel to the channel axis, as shown, in order to allow smooth engagement with the parallel interior side surfaces of the open central portion of the U-shaped member 102. In addition to guiding the sliding motion of the U-shaped member 102 during adjustment of the position of pawl member 100, the raised boss 114 also functions to prevent possible rotational shifting of the U-shaped member 102 around the clamping screw 108 after the latter has been tightened. Such rotational shifting of the U-shaped member 102 might otherwise result in gradual dislodgement of the pawl member 100 from its adjusted position during sharpening. It will be apparent that, without the raised boss 114, such rotational shifting of the U-shaped member 102 would be possible, at least to a limited extent, whenever the pawl member 100 has been adjusted to a position at which it is separated from the inner edge of the end portion 41 of the upper web of the sharpener body. This undesirable result is prevented by the provision of the raised boss 114, which is maintained in locking engagement with the open central portion of the U-shaped member 102 when the clamping screw 108 has been tightened.

In accordance with an important feature of the present invention, the chain saw sharpening kit is further provided with an alignment or setup pin 116, the function of which will now be described. The alignment pin comprises, in general, a shank portion 118 and a reduced end portion 120. The shank portion 118 is dimensioned for smooth insertion into either one of the two guide bores 52, 54 in lieu of the rotary burr 86, and will usually have a diameter approximately equal to that of the shank portion 90 of the rotary burr. When the alignment pin 116 is fully inserted into one of the guide bores 52, 54, the reduced end portion 120 allows a cutting link of the saw chain to be positioned within the channel 46 of the sharpener body such that when the rotary burr 86 is subsequently inserted into the guide bore and turned, the amount of material removed from the cutting link by the abradant end portion 88 of the burr will be exactly the amount necessary to produce a properly sharpened edge. The alignment pin 116 is also provided with an enlarged head portion 122 which is brought into contact with one of the flattened corners 49, 51 of the sharpener body extension 48 when the alignment pin is fully inserted into the corresponding one of the guide bores 52, 54. The head portion 122 thus defines the full extent of the insertion of the alignment pin into the guide bores 52, 54, and also performs a rotational positioning function as will be described hereinafter.

Figure 7:
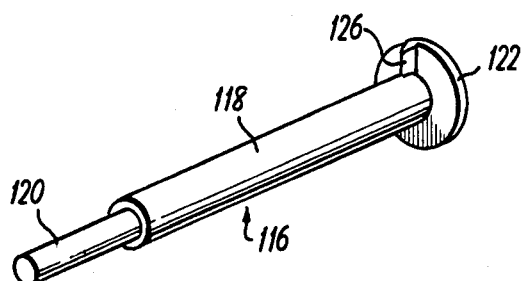
FIG. 7 is an enlarged perspective view of an alignment pin in accordance with the present invention.
Figure 8:
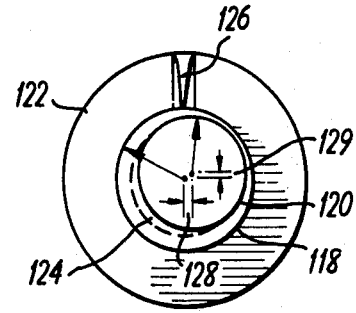
FIG. 8 is an end view of the alignment pin of FIG. 7, taken from the reduced end portion thereof.

The details of the alignment pin 116 will be more readily apprehended from the enlarged views of FIGS. 7 and 8, which illustrate the alignment pin in a perspective view and an end view, respectively. It will be seen that the shank portion 118 and reduced end portion 120 of the alignment pin 116 are both circular in cross-section, with the diameter of the reduced end portion 120 being somewhat smaller than that of the shank portion 118. As noted earlier, the diameter of the shank portion 118 of the alignment pin is preferably equal to the diameter of the smooth shank portion 90 of the rotary burr 86, since both devices are intended to fit smoothly and interchangeably into the guide bores 52 and 54 of the sharpener body 38. With reference to the end view of FIG. 8, which is taken from the reduced end portion of the alignment pin 116, it can be seen that the reduced end portion 120 is eccentrically offset from the shank portion 118 both horizontally and, to a lesser extent, vertically. In FIG. 8, therefore, the axis of the reduced end portion 120 is displaced to the right of, and slightly above, the axis of the shank portion 118 of the alignment pin. In practice, the amount of horizontal displacement of the axis of the reduced end portion 120 from the axis of the shank portion 118 is about 0.015 inch, and the amount of vertical displacement of the axis of the reduced end portion 120 from the axis of the shank portion 118 is about 0.004 inch. These displacements or offset distances are indicated by the reference numerals 128 and 129, respectively, in FIG. 8. This provides, with reference to FIG. 8, an inset portion 124 (outlined in phantom) across the lower and left-hand portions of the pin where the radial spacing between the reduced end portion 120 and the shank portion 118 is greater than it would have been if the reduced end portion 120 and shank portion 118 were precisely concentric. The inset portion 124 extends half-way around the reduced end portion 120 of the alignment pin and serves as an abutment surface for the forward edge of the cutting link to be sharpened. In order to assure that the inset portion 124 is brought into proper alignment with the forward edge of the cutting link, a rib or projection 126 is provided on the underside of the enlarged head 122 of the alignment pin 116. The projection extends radially inward from the edge of the head 122 of the alignment pin 116 and adjoins the shank portion 118, as shown. When the alignment pin 116 is inserted into one of the two guide bores 52, 54 of the sharpener body 38, the projection 126 engages the corresponding one of the notches 53, 55 (shown in FIG. 2) and thereby brings the alignment pin into the rotational position shown in FIG. 8. This assures that the inset portion 124 faces toward the forward edge of the cutting link in the open area 50 of the sharpener body channel. If it is assumed that the projection 126 defines the 0° position in FIG. 8, then the closest approach between the periphery of the shank portion 118 and the periphery of the reduced end portion 120 will occur at about the 75° point, and the inset portion 124 will extend approximately between the 165° and 345° points.

Referring back momentarily to FIGS. 2 and 6, it will be seen that abradant end portion 88 of the rotary burr 86 has what might be described as a "candle-flame" shape, tapering from a portion 87 of maximum or widest diameter in the area adjacent to the smooth shank portion 90 to an end region 89 of minimum diameter. When the rotary burr 86 is inserted into one of the guide bores 52, 54 of the sharpener body and rotated, the maximum-diameter region 87 of the abradant end portion 88 will eventually reach the edge of the cutting link being sharpened and will determine how much material is removed from the cutting edge during sharpening. Referring again to FIGS. 7 and 8, the diameter of the reduced end portion 120 of the alignment pin 116 is preferably made substantially equal to that of the maximum-diameter portion 87 of the abradant end 88 of the rotary burr. If it is supposed for a moment that the shank portion 118 and reduced end portion 120 of the alignment pin are arranged concentrically (rather than eccentrically), and that the position of a cutting link is adjusted by bringing its cutting edge 28 (FIG. 1) into abutting contact with the reduced end portion of the alignment pin after the latter has been inserted into the appropriate one of the guide bores 52 and 54, it is apparent that subsequent insertion of the rotary burr 86 into the guide bore will cause the widest part 87 of its abradant end portion 88 to just touch the cutting edge 28 of the cutting link. In this hypothetical situation, no sharpening would occur. However, with the reduced end portion 120 of the alignment pin eccentrically offset from the shank portion 18, as shown in FIG. 8, a different result obtains. In particular, when the alignment pin is inserted into one of the two guide bores 52, 54, with the projection 126 engaged with the corresponding one of the notches 53, 55 in the sharpener body 38, the inset portion 124 on the reduced end portion 120 of the alignment pin will be presented to the cutting edge 28 of the cutting link to be sharpened. If the cutting edge 28 of the cutting link is now brought into abutting contact with that part of the reduced end portion of the alignment pin, it will occupy a position slightly beyond the position it would have occupied if the reduced end portion 120 and shank portion 118 of the alignment pin were exactly coaxial or concentric. As a result, when the alignment pin 116 is removed and the rotary burr 86 is inserted and rotated, the abradant end portion 88 of the rotary burr 86 will bear against the cutting edge 28 of the cutting link and remove a certain amount of material therefrom, thereby resulting in a sharpened cutting edge. Referring to FIG. 8, and recalling that the diameter of the reduced end portion 120 of the alignment pin 116 is preferably made equal to the diameter of the widest portion 87 of the abradant end portion 88 of the rotary burr 86, it will be apparent that the amount of material removed from the cutting edge 28 during sharpening will be determined by the amount of horizontal and vertical offset between the axis of the reduced end portion 120 of the alignment pin 116 and the axis of the shank portion 118. These offset distances are, as noted earlier, indicated by the reference numerals 128 and 129 in FIG. 8. Thus, by virtue of the alignment pin 116, only the proper amount of material will be removed from the cutting edges 28 of the cutting links during sharpening.

Figure 3:
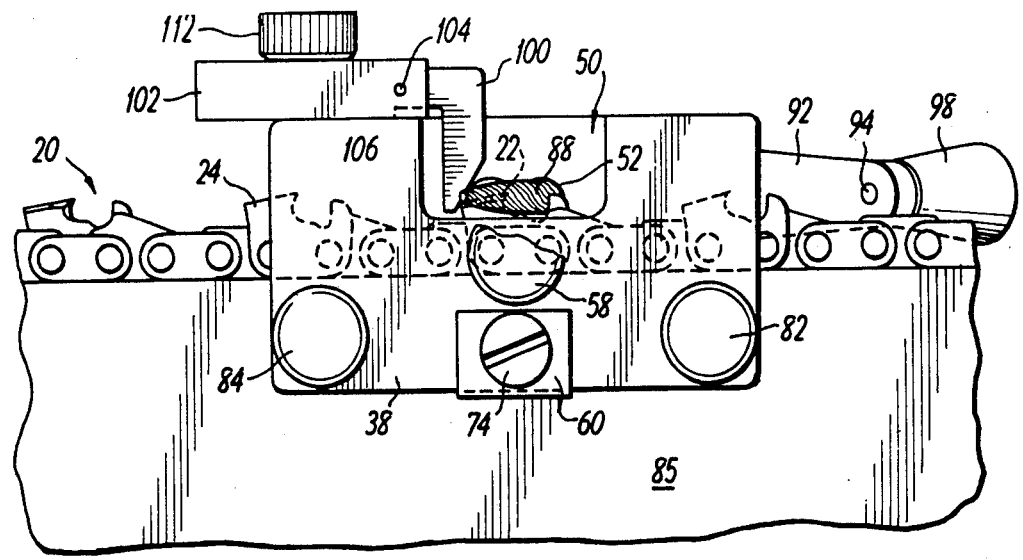
FIG. 3 is a left side elevational view of the chain saw sharpener of FIG. 2, together with a portion of the saw bar on which the sharpener is mounted.

The manner in which the chain saw sharpening kit of the present invention may be used to sharpen the cutting links of a chain saw will now be described with reference to FIG. 26. With all clamping screws 58, 82, 84 and 108 loosened, and with the pawl member 100 withdrawn fully to the edge of the end portion 41 of the upper web, the sharpener body 38 is placed over the bar 85 of the chain saw in a straddling manner as illustrated in FIGS. 3–6. At this point, the rotary burr 86 is not yet inserted into either of the guide bores 52 and 54. The alignment pin 116 is now inserted fully into one of the two guide bores, which will be assumed to be the guide bore 52 for the purpose of example, and the projection 126 on the alignment pin is brought into engagement with the notch 53 on the sharpener body. The sharpener body 38 is now moved bodily until the reduced end portion 120 of the alignment pin rests against the cutting edge 28 of the cutting link to be sharpened, which will be a right-hand cutting link 22 as shown in FIG. 1. The two outer clamping screws 82 and 84 are now tightened to clamp the sharpener body 38 to the bar 85 of the chain saw. The middle clamping screw 58 is then tightened to cause the flexible clamping strip 60 to bear against the side of the cutting link 22 which is to be sharpened. The U-shaped support member 102 is now moved forward along the end portion 41 of the upper web of the sharpener body in order to bring the lower end of depending pawl member 100 into contact with the back edge of the cutting link 22, as shown in FIG. 3. The clamping screw 108 is then tightened to lock the U-shaped support member 102, and hence the pawl member 100, in position. The middle clamp screw 58 is then loosened and the alignment pin 116 is removed from the guide bore 52.

Figure 5:
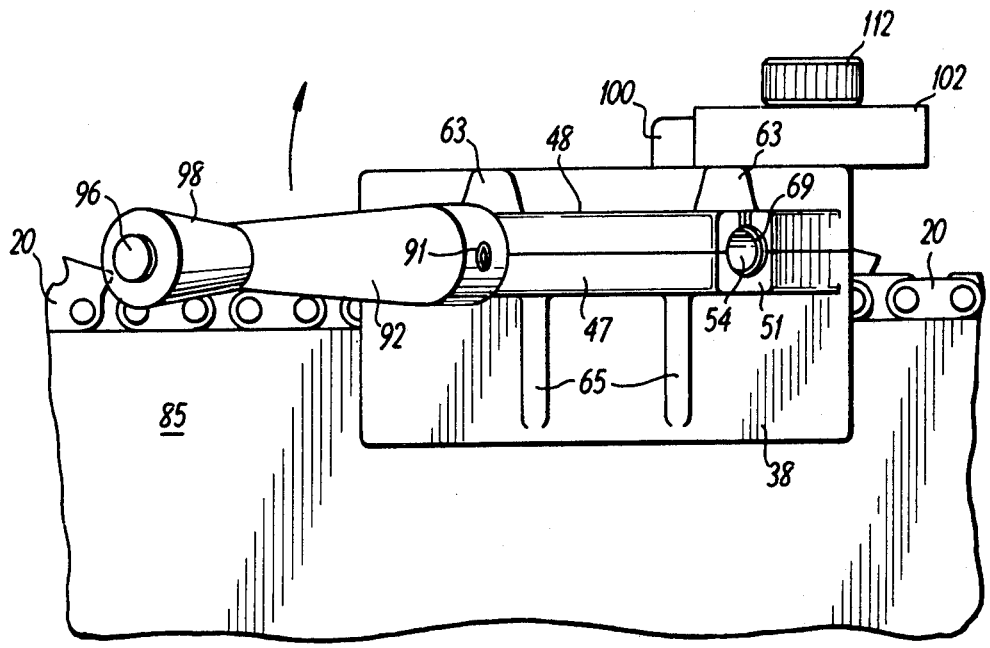
FIG. 5 is a right side elevational view of the chain saw sharpener of FIG. 2, together with a portion of the saw bar on which the sharpener is mounted.

With the sharpener now prepared for sharpening, the middle clamp screw 58 is retightened to clamp the first cutting link 22 in position relative to the guide bore 52. The rotary burr is then inserted into the guide bore 52 and rotated, by means of the hand crank 92, in a clockwise direction as shown in FIG. 5. As the hand crank 92 is turned, the abradant end portion 88 of the rotary burr advances into the open area 50 of the sharpener body channel and thereby sharpens the cutting edge 28 of the cutting link 22. When the base of the hand crank touches the flattened corner 49 of the sharpener body, as shown in FIG. 6, sharpening is completed and the rotary burr 86 is partially withdrawn (preferably while still being turned in the same direction) back into the guide bore 52 by a sufficient distance to clear the open area 50 of the sharpener body channel for the arrival of the next cutting link. The middle clamping screw 58 is then loosened, and the saw chain 20 is manually advanced (preferably by means of the protective hand slide of FIG. 11, as will be described hereinafter) to bring the next cutting link into the sharpening position adjacent to the opening of the guide bores 52. Since the next cutting link will be a left-hand cutting link 24 as shown in FIG. 1, manual advancing of the saw chain is continued until the next right-hand cutting link is moved into position. It should be noted that, due to the ability of the pawl member 100 to pivot freely in the direction away from the end portion 41 of the upper web (i.e., in a counter-clockwise direction as viewed in FIG. 3), the pawl member does not obstruct the passage of the successive cutting links through the open area 50 of the sharpener body channel. When the next right-hand cutting link has moved past the pawl member 100 and into the open area 50 of the channel, it is then moved in the reverse direction until the rear portion of the cutting link abuts against the lower end of the pawl member 100. Since the pawl member 100 is restrained against movement in a direction toward the end portion 41 of the upper web (i.e., in the clockwise direction as viewed in FIG. 3) by the shelf 106, the pawl member will resist further movement of the cutting link in this direction. This places the next right-hand cutting link in the same position occupied by the right-hand cutting link that was previously sharpened, whereby the next right-hand cutting link is now properly located relative to the guide bore 52 for sharpening. The middle clamping screw 58 is then retightened to clamp the cutting link in place. The sharpening operation is then repeated by inserting the rotary burr 86 and rotating the hand crank 92 until the abradant end portion 88 of the burr extends fully into the open area 50 of the sharpener body channel as shown in FIG. 6. The rotary burr is then partially withdrawn, as before, and the middle clamping screw 58 is loosened so that the saw chain 20 may again be advanced to bring the next right-hand cutting link into position for sharpening.

The foregoing sequence of operations is repeated until all right-hand cutting links on the saw chain 20 have been sharpened. As this point, the clamping screws 58 and 108 are loosened, the pawl member 100 is withdrawn fully toward the edge of the end portion 41 of the upper web, and the saw chain 20 is advanced to bring a left-hand cutting link within the open area 50 of the sharpener body channel adjacent to the guide bore 54. The alignment pin 116 is then inserted fully into the second guide bore 54 and its projection 126 is engaged with the notch 55 on the sharpener body. The left-hand cutting link 24 is then advanced until its cutting edge 28 is brought into contact with the reduced end portion 120 of the alignment pin, whereupon the middle clamp screw 58 is tightened to clamp the left-hand cutting link in position. The U-shaped support member 102 is then moved forward to bring the lower end of the pawl member 100 into contact with the rear edge of the cutting link 24, and the clamping screw 108 is tightened to lock the U-shaped member 102 and pawl member 100 in position. The middle clamping screw 58 is then loosened and the alignment pin 116 is removed from the guide bore 54. With the rear edge of the left-hand cutting link 24 resting against the pawl member 100, the middle clamping screw 58 is retightened in preparation for sharpening. Sharpening is now carried out by inserting the rotary burr 86 into the guide bore 54, rotating the hand crank 92 until the base of the hand crank is brought into contact with the flattened corner 51 of the sharpener body, and then partially withdrawing the rotary burr from the guide bore 54 (preferably while still turning the hand crank 92). The middle clamping screw 58 is then loosened to permit the next left-hand cutting link to be brought into position by manually advancing the saw chain 20. As decribed earlier, the ability of the pawl member 100 to pivot in a direction away from the end portion 41 of the upper web allows the successive cutting links to move freely through the open area 50 of the sharpener body channel in the forward direction between sharpening operations. After the next left-hand cutting link passes the pawl member 100, it is then moved in the reverse direction until the rear portion of the cutting link touches the pawl member 100. Since the pawl member 100 is restrained against movement in the reverse direction, it will resist further movement of the cutting link in this direction and will thereby serve to locate the next left-hand cutting link in the same position occupied by the first left-hand cutting link during the previous sharpening operation. The middle clamping screw is then retightened to clamp the next left-hand cutting link in position, and the sharpening operation is repeated by advancing the rotary burr 86 into the open area 50 of the sharpener body channel while turning the hand crank 92. The foregoing sequence of operations is then repeated for the subsequent left-hand cutting links, until all left-hand cutting links on the saw chain 20 have been sharpened.

In order to facilitate the sharpening operation, the first right-hand or left-hand cutting link to be sharpened may be provided with a visible mark (e.g., using crayon, nail polish, or any other suitable marking material) so that it may be easily identified when it again reaches the open area 50 of the sharpener body channel.

When the sharpening operation is completed, the right-hand and left-hand cutting links are visually inspected to assure that they are of the same length. If one set is found to be longer than the other, the sharpening operation is repeated on the longer set until uniformity is achieved. The clamping screws 58, 82 and 84 are then loosened and the sharpener body 38 as a whole is removed from the saw bar 85.

It will be appreciated that, by virtue of the alignment pin 116, it is possible to adjust the positions of the right-hand or left-hand cutting links within the sharpener body channel in a single operation, without the need for subsequent fine adjustments. The use of the alignment pin 116 is required only twice, once for the adjustment of the right-hand cutting link positions, and once for the adjustment of the left-hand cutting link positions. The positions of all subsequent right-hand cutting links (or all subsequent left-hand cutting links) are then established by the pivoting pawl member 100. It should also be noted that, due to the use of the alignment pin 116 for the necessary adjustment procedure, the possibility of damage to the abradant end portion 88 of the rotary burr 86 is avoided. In the event that a cutting link is positioned too close to the selected guide bore 52 or 54 prior to the adjustment, it is the alignment pin (rather than the rotary burr) that will strike the improperly positioned cutting link.

The construction of the sharpening kit can be simplified, if desired, by omitting the pawl member 100, U-shaped support member 102, and clamping screw 108. In that event, however, the alignment pin 116 must be employed repeatedly to position each successive right-hand or left-hand cutting link in the proper location for sharpening. This, in turn, require repeated removal and reinsertion of the rotary burr 86. Hence it is preferred that the pawl member 100, U-shaped support member 102, and clamping screw 108 be retained for use in positioning the successive cutting links in the manner described previously.

It should be pointed out that the alignment pin 116 may be provided with a configuration different from that illustrated in FIGS. 7 and 8. Thus, for example, the reduced end portion 120 of the alignment pin may be made concentric or coaxial with the shank portion 118, if desired, and the diameter of the reduced end portion 120 may then be made less than that of the widest part 87 of the abradant end portion 88 of the rotary burr 86. The difference in radius between the reduced end portion 120 of the alignment pin and the widest part 87 of the abradant end portion 88 of the rotary burr will then determine the amount of stock removal from the cutting edges 28 of the cutting links 22, 24 during the sharpening operation. In this embodiment, the rotational position of the alignment pin in the guide bores 52, 54 would not be important and the projection 126 on the alignment pin could therefore be eliminated. However, the embodiment illustrated in FIGS. 7 and 8, wherein the reduced end portion 120 of the alignment pin is eccentrically offset from the shank portion 118 and is equal in diameter to the widest part 87 of the abradant end portion 88 of the rotary burr, is preferred for the reason that it allows the circular curvature of the reduced end portion 120 of the alignment pin to be matched precisely to the circular curvature of the cutting edges 28 of the right-hand and left-hand cutting links 22 and 24. This permits the cutting edges of the cutting links to be smoothly and positively engaged with reduced end portion 120 of the alignment pin 116 during the adjustment procedure.

FIG. 9 is an exploded perspective view of a depth gauge attachment 130 which permits the sharpening kit of FIGS. 2–6 to be used alterntatively to file the depth gauges 30 of the saw chain 20 in FIG. 1. This will normally be done after the cutting edges 28 of the left-hand and right-hand cutting links 22, 24 on the saw chain 20 have been sharpened as described previously. The depth gauge attachment 130 includes an elongated gauge bar 132 which is shaped and dimensioned to be received in the upper part of the channel 46 of the sharpener body 38, along the underside of the upper web 40, 41, and a threaded fastener 134 with an enlarged head portion 136. The threaded shaft 144 of the fastener 134 is dimensioned to be loosely received through the threaded bore 110 in the upper web portion 41 of the sharpener body 38, and is engageable with a threaded bore 133 which penetrates the gauge bar 132. The threaded bore 133 is located closer to one end of the gauge bar 132 than to the other end thereof, as shown in FIG. 9. As shown more clearly in the end view of FIG. 10, the gauge bar 132 has a flat surface 138 on the underside thereof, and the two upper longitudinal edges 140, 142 of the gauge bar are rounded or beveled as shown. The two interior edges 57, 59 of the sharpener body channel 46 in FIG. 1 are rounded in a manner complementing the beveled edges 140, 142 of the gauge bar 132.

Figure 13:
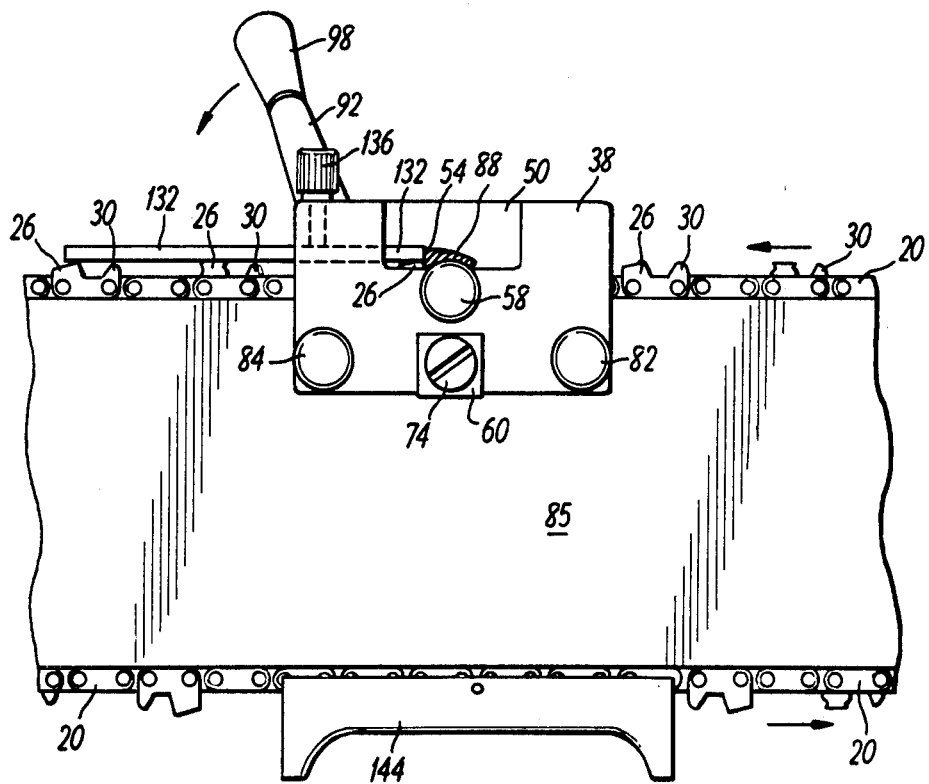
FIG. 13 is a side elevational view illustrating the sharpener of FIGS. 2-6 with the depth gauge attachment of FIGS. 9-10 in its full use position, and the protective hand slide in place.

Referring now to FIG. 13, the depth gauge attachment is affixed to the sharpener body by first removing the clamping screw 108 and the U-shaped member 102 which supports the pawl 100, placing the gauge bar 132 in the upper part of the channel 46 of the sharpener body so that the beveled edges 140, 142 of the gauge bar rest smoothly along the rounded interior edges 57, 59 of the channel, and then inserting the threaded fastener 134 thorugh the bore 110 and into engagement with the threaded bore 133 in the gauge bar 132. When the threaded fastener 134 is tightened, the enlarged head portion 136 thereof bears against the top surface of the upper web portion 41, thereby bringing the gauge bar 132 into abutting contact with the underside of the upper web. The engagement between the upper beveled edges 140, 142 of the gauge bar 132 and the rounded interior edges 57, 59 of the sharpener body channel 46 assures a smooth mechanical fit between the two. A narrow ledge 43 is preferably provided in the sharpener body channel 46 along the inside of the second side wall 44, assist in locating the gauge bar 132. In use, the flat underside surface 138 of the gauge bar 132 provides a guide surface for the upper portions of the cutting links 22, 24 on the saw chain 20 of FIG. 1. The thickness of the gauge bar 132 is selected to cause the saw chain 20 to assume a sufficiently lower position within the channel 46 of the sharpener body 38 to bring the top of the depth gauge portions 30 into contact with the abradant end portion 88 of the rotary burr 86 when the rotary burr is inserted into one of the guide bores 52, 54. In the illustrated embodiment, the depth gauge filing operation is carried out by inserting the rotary burr 86 into the guide bore 54, although it will be apparent that the assembly could be modified, if desired, to use the guide bore 52 for this purpose.

The depth gauge attachment 130 is preferably used in conjunction with a protective hand slide 144, which is shown in perspective in FIG. 11. The hand slide 144 comprises an elongated handle member 146 which is adapted to be placed against the bar 85 of the chain saw, the handle member having a longitudinal channel 148 therein for receiving the saw chain 20. A pin 150 is mounted transversely in the central portion of the channel 148 for engaging a cutting link of the saw chain. The handle member 146 is provided with enlarged portions 152, 154 at each end thereof on the side opposite the channel 148 to prevent the user's hand from inadvertently slipping off the handle member 146. In use, the hand slide 144 is placed against the bar 85 of the chain saw on the side opposite to that on which the sharpener body 38 is mounted, as shown in FIG. 13, and the pin 150 is engaged with a cutting link 22 or 24, or between two successive cutting links. The hand slide 144 may then be used to advance the saw chain 20 around the saw bar 85 without the risk of injury from the sharpened cutting edges of the cutting links. This greatly facilitates the depth gauge filing operation, which requires that the cutting links 22, 24 be in motion while the rotary burr 86 is turned. It should be noted that, although FIG. 13 shows the hand slide 144 in engagement with the lower portion of the saw bar 85, the hand slide 144 is not self-supporting thereon and must be maintained in contact with the saw chain 20 by the pressure of the user's hand.

It will be apparent that the pin 150 of the hand slide 144 may be replaced, if desired, by any other means suitable for engaging the saw chain 20. Thus, for example, the channel 148 of the hand slide may be formed with an integral transverse rib or projection in the central part thereof, in lieu of the pin 150.

Figure 12:
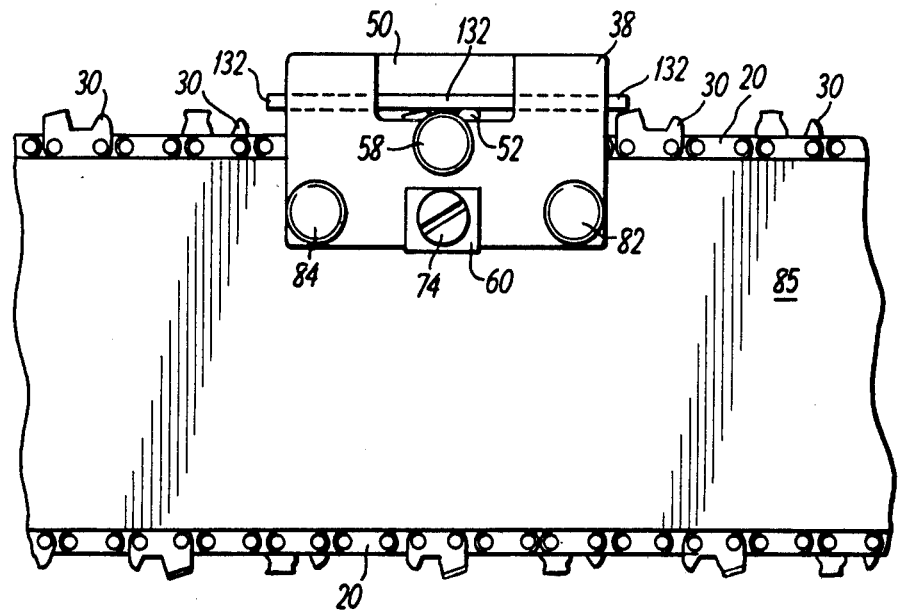
FIG. 12 is a side elevational view illustrating the preliminary mounting of the sharpener of FIGS. 2-6 on a saw bar in preparation for use with the depth gauge attachment of FIGS. 9-10.

The use of the depth gauge attachment 130 of FIGS. 9-10 will now be described with reference to FIGS. 12-13. As noted earlier, the clamping screw 108 and the U-shaped support member 102 for the pawl member 100 are removed prior to the installation of the depth gauge attachment 130, since these components are not required during the depth gauge filing operation. The gauge bar 132 is now inserted into the sharpener body channel 46 with its beveled edges 140, 142 engaging the rounded interior edges 57, 59 of the sharpener body channel, and with an equal amount of the gauge bar 132 protruding from each end of the channel 46. The sharpener body is then placed over the saw bar 85 so that the gauge bar 132 rests in a flat position atop the saw chain 20, as shown in FIG. 12. The two outer clamping screws 82, 84 are then tightened to clamp the sharpener body 38 to the saw bar 85. With the sharpener body now properly seated atop the saw chain 20, the gauge bar is withdrawn to the extent necessary to align the threaded bore 133 therein with the layer threaded bore 110 in the upper web portion 41 of the sharpener body. The threaded fastener 134 is then inserted through the bore 110 so that it engages the threaded bore 133 in the gauge bar 132, whereupon the fastener 134 is tightened to draw the end of the gauge bar 132 upward into snug engagement with the underside of the upper web portion 41 within the sharpener body channel 46. The components are now in the relationship illustrated in FIG. 13. It will be observed that the left-hand portion of the gauge bar 132 protrudes beyond the left-hand end of the sharpener body channel 46, whereby this portion of the gauge bar 132 now serves as a guide for the saw chain 20 outside the sharpener body 38. It will also be observed that the right-hand end of the gauge bar 132 is positioned to the left of the opening of the guide bore 54, thereby providing the necessary clearance for the insertion of the abradant end portion 88 of the rotary burr 86. Thus, in its full use position as illustrated in FIG. 13, the gauge bar 132 occupies only a portion of the length of the sharpener body channel 46, this portion not including the area immediately adjacent to the opening formed by the guide bore 54 in the second side wall 44 of the sharpener body.

With the foregoing set-up procedure now completed, the depth gauge filing operation may be carried out in connection with the rotary burr 86. It should be noted that the rotary burr 86 is preferably the same as that which was used during the sharpening operation; therefore, the only additional components required for the depth gauge filing operation are the depth gauge attachment 130 and (optionally) the protective hand slide 144. The depth gauge filing operation is commenced by fully inserting the abradant end portion 88 of the rotary burr 86 into the guide bore 54, and pressing the protective hand slide 144 into engagement with the saw chain 20 on the underside of the saw bar 85. The hand slide 144 is then used to advance the saw chain 20 in the left-hand direction through the sharpener body 38 to a point where the cutting edge of the cutting link is not touching the abradant end portion 88 of the burr. The hand crank 92 is then turned in the direction indicated in FIG. 13 while the saw chain 20 is advanced, using the protective hand slide 144, in the left-hand direction through the sharpener body 38. This motion is opposite to the direction in which the saw chain 20 normally travels when the chain saw is in operation. As the depth gauge portion 30 of the cutting link passes under the burr, it is filed to the proper height as determined by the thickness of the gauge bar 132 and the diameter of the widest part 87 of the abradant end portion 88 of the burr. The turning of the hand crank 92 is continued until the depth gauge 30 has been completely filed, whereupon the rotary burr 86 is partially retracted into the guide bore 54 to allow the next cutting link to be brought into position. The foregoing sequence of operations is then repeated to file the depth gauge portion 30 of the remaining cutting link. It should be noted it is not necessary to discriminate between the right-hand and left-hand cutting links 22 and 24 during the depth gauge filing operation. Thus the cutting links of both types may be filed sequentially while the rotary burr 86 remains within the guide bore 54. It should also be noted that, since the cutting links are required to be in motion during the depth gauge filing operation, the middle clamping screw 58 is not tightened and the clamping strip 60 is thereby kept disengaged from the sides of the cutting links 22, 24.

At the conclusion of the depth gauge filng operation, the rotary burr 86 is removed and the outer clamping screws 82 and 84 are loosened to allow the sharpener body 38 to be removed from the saw bar 85. The threaded fastener 134 is then removed and the gauge bar 132 is withdrawn from the sharpener body channel. The U-shaped member 102 and clamping screw 108 may then be replaced as shown in FIGS. 2–6 to prepare the sharpener for a later sharpening operation. Preferably, the rotary burr 86 is reinserted into one of the guide bores 52, 54 for storage in order to protect the abradant end portion 88 of the burr from possible damage.

In practice, it will usually be necessary to file the depth gauges every fourth or fifth time that the cutting edges of the cutting links are sharpened, or whenever a large amount of material is removed from the cutting edges as a result of sharpening.

It will be appreciated that, by providing for the alternative attachment of the U-shaped support member 102 and pawl member 100 (which are required only during the sharpening operation), or the depth gauge attachment 130 of FIGS. 9–10, it is only necessary to manufacture one type of sharpener body 38 which can then be adapted to both purposes. A further advantage of this arrangement is that the basic sharpening kit of FIGS. 2–6 can be sold with or without the depth gauge attachment of FIGS. 9–10, but the purchaser of the basic sharpening kit has the option of later puchasing the depth gauge attachment separately for use in connection with the originally-purchased sharpener.

Although the protective hand slide 144 of FIG. 11 is primarily intended for use in connection with the depth gauge attachment 130 of FIGS. 9–10, the hand slide 144 can also be used during the sharpening operation described earlier in connection with FIGS. 2–6. Such use of the protective hand slide 144 is illustrated in FIG. 14. After a given cutting ink has been sharpened, and the middle clamping screw 58 has been loosened to release the clamping pressure on the sharpened cutting link, the hand slide can be pressed against the saw chain 20 on the opposite side of the saw bar 85, as shown, in order to advance the next cutting link into position for sharpening.

Although the details of construction of the chain saw kit are not necessary to an understanding of the invention, a preferred manner of construction will be described briefly for the purpose of illustration. The sharpener body 38 in FIG. 2 is preferably made from a high-strength material, such as die-cast zinc alloy. The same material may be used for the gauge bar 132 of the depth gauge attachment 130. The sharpener body 38 may be cast in two parts, the first part comprising the first side wall 42, the upper web 40, 41, and the upper half of the horizontal extention 48, and the second part comprising the second side wall 44 and the lower half of the horizontal extension 48. The seam between these two parts is indicated at 61 in FIGS. 2, 4, and 5. These two parts may be joined by a number of studs, rivets or other suitable fasteners (not shown) penetrating the upper and lower halves of the horizontal extension 48 on either side of the guide bores 52, 54. Pairs of integral strengthening ribs 63 and 65 (also visible in FIGS. 2, 4 and 5) are preferably provided above and below the horizontal extension 48 where it adjoins the second side wall 44 in order to provide added strucutral support. The pawl member 100 is preferably made from a hardened sintered metal, which nearly matches the cutting links of the saw chain 20 in hardness. This prevents undue wear on the pawl member 100 due to repeated contact with the cutting links of the saw chain. Tempered steel liner bushings 67, 69 are preferably provided in the guide bores 52, 54, as shown in FIG. 6, in order to provide a smooth and accurate fit for rotary burr 86. As noted earlier, the rotary burr 86 is preferably machined from tungsten carbide, or some other material of suitable hardness and durability, to provide a sharpening surface which will not readily become worn after repeated uses. The hand crank 92 and swivel-type handle 98 which are attached to the rotary burr 86 are preferably made from the same zinc alloy material that is used for the sharpener body 38. The same material may also be used for the U-shaped pawl supporting member 102. Steel is a suitable material for the alignment pin 116; in this case, wear is not a serious problem since the alignment pin is used only briefly during the sharpening operation. The protective hand slide 144 may be made from aluminum, if desired, or from the same zinc alloy material that is used for the sharpener body 38. The various clamping screws and fasteners 58, 82, 84 and 108, as well as the swivel pin 94, may be made from zinc-plated steel or the like. The flexible clamping strip 60 is preferably made from spring-tempered steel as noted earlier. The screw 74, lock washer 76, set screw 91, and pins 104 and 150 are standard hardware items and may be made from any suitable material.

It will ordinarily be desirable to manufacture the rotary burr 86 in a number of different sizes so that the sharpening kit of the present invention can be used with all of the commonly-used saw chain sizes. Exemplary dimensions for the widest diameter portion 87 of the abradant end portion of the rotary burr (before machining) are 5/32 inch, 3/16 inch, and 7/32 inch. For the 5/32-inch burr, the length of the tapered portion 89 will be about 0.324 inch, the length of the maximum-diameter portion 87 will be about 0.541 inch, and the burr diameter at the tapered tip will be about 1/16 inch. For the 3/16-inch burr, these dimensions will be about 0.336 inch, 0.559 inch, and 5/64 inch, respectively. For the 7/32-inch burr, these dimensions will be about 0.367 inch, 0.568 inch, and 3/32 inch, respectively. For all burr sizes, the diameter of the shank portion 90 is about 0.250 inch and the burr is about 2.75 inches in overall length. The alignment pin 116 has a head portion 122 which is about ½ inch in diameter and a shank portion 118 which is about 0.250 inch in diameter, with the projection 126 extending out from the underside of the head portion 122 by about 1/16 inch. The diameter of the reduced end portion 120 of the alignment pin 116 will depend upon the burr size used, and in each case should be substantially equal to the diameter of the widest part 87 of the abradant end portion 88 of the burr. Thus, for the 5/32-inch, 3/16-inch, and 7/32-inch burr sizes, the diameter of the reduced end portion 120 of the alignment pin 116 will be about 0.156 inch, 0.187 inch, and 0.218 inch, respectively. In each case, the axis of the reduced end portion 120 of the alignment pin is displaced from the axis of the shank portion 118 by about 0.015 inch in the horizontal direction and by about 0.004 inch in the vertical direction, taking the horizontal and vertical directions to be defined as shown in FIG. 8 (i.e., with the projection 126 pointing vertically upward). The overall length of the alignment pin will of course depend on the size of the sharpener body 38 (as will the length of the rotary burr 86), but in the preferred embodiment the total length of the shank portion 118 and the reduced end portion 120 is about 2 inches, with the shank portion 118 being about 1⅜ inches in length and the reduced end portion being about ⅝ inch in length. The sharpener body 38 is preferably about 3¼ inches long (measured along the side walls 42 and 44), 1¾ inches high, and 2⅛ inches deep (including the horizontal extension 48). The side walls 42, 44 and upper web 40, 41 of the sharpener body are preferably about ⅛ inch thick. The horizontal extension is preferably about ½ inch in thickness, 2 3/16 inches in length, and extends outwardly from the second side wall 44 of the sharpener body by about 1 inch. The sharpener body channel 46 preferably has a width of about ⅜ inch between the side walls 42 and 44, with a vertical distance of about 5/32 inch being provided between the top inside surface of the channel 46 and the plane which contains axes of the two horizontal guide bores 52 and 54. The thickness of the gauge bar 132 of FIGS. 9–10 should then be about 0.209 inch (for the 5/32-inch burr), 0.222 inch (for the 3/16-inch burr), or 0.235 inch (for the 7/32-inch burr). The overall length of the gauge bar 132 is preferably about 4 inches. The hand slide 144 of FIG. 11 is about 4½ inches in length, and the longitudinal channel 148 therein is about ⅜ inch in width and 0.312 inch in depth. The pin 150 may comprise a standard ⅛-inch diameter roll pin which is press-fitted into suitable holes formed in the sides of the hand slide 132. A clearance of about 0.0075 inch is preferably maintained between the periphery of the pin 150 and the bottom surface of the channel 148 to prevent the pin 50 from making contact with the sharpened cutting edges 28 of the cutting links on the saw chain 20 of FIG. 1.

It is to be understood that all of the foregoing dimensions and material specifications are presented merely by way of example and are not intended to limit the scope of the invention in any way.

Although the present invention has been described with reference to a preferred embodiment, it is to be understood that the invention is not limited to the details thereof. A number of possible modifications and substitutions have been suggested in the course of the foregoing detailed description, and others will occur to those of ordinary skill in the art. All such modifications and substitutions are intended to fall within scope of the invention as defined in the appended claims.

What is claimed is:

1. A protective hand slide for engaging the bar of a chain saw in order to allow the saw chain thereon to be manually advanced, said hand slide comprising an elongated handle member adapted to be placed against the edge of a chain saw bar, said handle member having a longitudinal channel therein for receiving the saw chain and a transversely-mounted pin within said channel for engaging a cutting link of the saw chain.

2. A protective hand slide as claimed in claim 1, wherein said handle member includes enlarged portions at each end thereof on the side opposite the channel of the handle member.

* * * * *